Patented Mar. 30, 1943

2,315,314

UNITED STATES PATENT OFFICE 2,315,314

NICOTINE DERIVATIVE

Alfred Burger, Charlottesville, Va., assignor to Tobacco By-Products and Chemical Corporation, Louisville, Ky., a corporation of Delaware No Drawing. Application June 10, 1941, Serial No. 397,467

9 Claims. (Cl. 260—291)

This invention relates to new derivatives of nicotine and more particularly to the alpha- or 2- and 6-oxynicotine ethers. Within this generic designation I intend to embrace the 2- and 6-alkoxy, aryloxy and aralkoxy nicotines according to the general formula

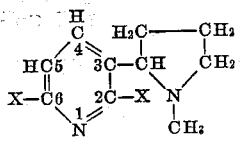

in which at least one of the X's stands for a substituent of the general formula—ORY in which O is oxygen, R is an alkyl, aryl or aralkyl group, and Y is hydrogen or an amino group of the formula NZZ in which Z stands for hydrogen or an alkyl, aryl or aralkyl group.

Certain nicotine derivatives are known to have insecticidal properties and to be of pharmacological interest but generally such derivatives as have been made and tested have been found to be too toxic, and it is therefore an object of the present invention to provide compounds having useful pharmacological properties.

The 2- and 6-oxynicotine ethers readily may be prepared by reacting the 2- and 6-halogenonicotines with the alkali metal alk-, aryl- and aralkoxides. Depending upon the location of the halogen, the corresponding 2- or 6-alk-, aryl- or aralkoxynicotines are produced.

The invention is illustrated hereinafter by specific examples of the preparation of nicotine derivatives by reaction of 2- and 6-halogenonicotines with alkali metal derivatives of n-butanol, β-diethylamino ethanol, 2-amino-2-methyl propanol, benzyl alcohol, 1-menthol, propanol-2 and phenol.

The ethers generally are oily and form highly water-soluble salts with various acids, some of which readily may be obtained in the crystalline state. Their aqueous solutions, and even those of the salts which were obtainable only as oils, are quite stable. It may be noted, however, that 2-benzyloxynicotine hydrolyzes slowly in acid and neutral solutions with liberation of benzyl alcohol. It will be observed that the examples are representative of both 2- and 6-alkoxy, aryloxy and aralkoxy nicotines containing simple alkyl groups, cyclic alkyl groups, alkyl groups containing amino groups, aralkyl groups and aryl groups. Nicotine derivatives having straight, branched, acidic and basic side chains are contemplated by the invention.

In the preparation of the derivatives, the chloronicotines are used as representative of the halogenonicotines as starting materials. The chloronicotines may be prepared by known methods involving first the preparation of the 2- and 6-aminonicotines and then conversion into the corresponding chloronicotines. Descriptions of these preparations are, therefore, omitted from this disclosure.

Example I 2-butoxynicotine.—0.8 g. of 2-chloronicotine was added to a solution of 0.25 g. of sodium in 10 cc. of absolute butanol and the solution was refluxed for 4 hours. Sodium chloride separated out after a short time, and its quantity increased for at least 2 hours. The main amount of butanol was distilled off in vacuum at 100° C., and the residue was dissolved in 0.1 N hydrochloric acid and extracted twice with ether in order to remove all of the butyl alcohol. The colorless aqueous solution was made alkaline with sodium hydroxide solution, and the oil was extracted three times into ether. The ether extracts were combined, washed with water, dried over anhydrous sodium sulfate, filtered, and the solvent was evaporated. The colorless oily residue was distilled under 2 mm. pressure. The hydrochloride was oily, very soluble in water, ethanol and acetone and insoluble in ether. The sulfate also remained oily. The picrate crystallized from ethanol on standing. It was recrystallized from methanol, and appeared as light yellow needles, M. P. 124–126° C.

Example II 2-(2-diethylaminoethoxy)nicotine.—A mixture of 0.2 g. of sodium, 6 cc. of absolute toluene (dried over sodium), and 1.1 cc. of β-diethylaminoethanol was boiled under reflux for about 75 minutes until all sodium had gone into solution. 1.0 g. of 2-chloronicotine was added, and refluxing was continued for 4 hours. Sodium chloride precipitated after some time. The reaction mixture was cooled and extracted with dilute hydrochloric acid. The aqueous layer was made alkaline with sodium hydroxide solution and the oily precipitate was extracted with three portions of ether. The combined ether extracts were dried over potassium hydroxide, decanted, the solvent was distilled off on a steam bath, and the mobile oily residue fractionated three times under 1 mm. pressure. The middle fraction retained a constant refractive index after repeated distillation in a high vacuum, $n_D^{25}$ 1.5094, $n_D^{26}$ 1.5089. No crystalline derivatives have been obtained as yet. The colorless stable oily hydrochloride is easily soluble in water.

Example III

*2-(2-amino-2-methylpropoxy) nicotine.*—To 10 cc. of absolutely dry toluene was added 0.25 g. of sodium, and then 1.0 g. of 2-amino-2-methylpropanol, and the mixture was refluxed for 1 hour until all sodium had dissolved. 1.0 g. of 2-chloronicotine was added, refluxing was continued for 4 hours, and the mixture was worked up as described in the preceding example. The oily base was fractionated under 2 mm. pressure. The lower boiling fractions were largely soluble in water and contained some unchanged 2-amino-2-methylpropanol. The higher boiling fraction was redistilled in a high vacuum and appeared as an almost colorless oil of amine-like odor, $n_D^{28}$ 1.5203.

*Hydrochloride.*—The base was dissolved in a little acetone and carefully neutralized with alcoholic hydrogen chloride to Congo blue reaction. Enough ethanol was added to dissolve the precipitated oily salt which then crystallized slowly on scratching. Recrystallization from ethanol-ether yielded colorless crystals, M. P. 239–240° C. (dec.) (on moderately fast heating). The salt was very soluble in alcohol and in water, and could be precipitated from an alcohol solution by addition of acetone or ether.

Example IV

*2-benzyloxynicotine.*—0.5 g. of sodium was dissolved in 10 cc. of freshly distilled benzyl alcohol with warming, 1.5 g. of 2-chloronicotine was added, and the solution was refluxed for 10 hours. The cooled mixture was diluted with ether, and the basic fraction was extracted into dilute hydrochloric acid. The acid layer was extracted several times with ether to remove all benzyl alcohol, and then made alkaline with sodium hydroxide solution. The precipitated oil was extracted into ether, the ether layer was washed with a little water, dried over anhydrous sodium sulfate, and evaporated. The oily residue was distilled and redistilled under 12 mm. pressure. 2-benzyloxynicotine appeared as a colorless oil, $n_D^{26}$ 1.5400.

Example V

*6-(l-menthoxy) nicotine.*—0.2 g. of sodium was dissolved in 3 g. of l-menthol by heating at 150° C. for 4 hours. When all sodium had disappeared, a solution of 0.8 g. of 6-chloronicotine in 10 cc. of dry xylene was added, and the mixture was refluxed for 10 hours. It was then cooled, diluted with ether and extracted with dilute hydrochloric acid. The acid layer was extracted with ether to remove non-acidic organic materials, made alkaline with sodium hydroxide solution, and the menthoxynicotine was extracted into ether. The ether layer was washed with water, dried over sodium sulfate, evaporated, and the residue was distilled twice under 1 mm. pressure. 6-(l-menthoxy) nicotine appeared as a heavy, viscous oil, $n_D^{26}$ 1.5164.

The hydrochloride remained amorphous. The picrate separated from alcohol as yellow crystals, M. P. 118–118° C.

Example VI

*2-isopropoxynicotine.*—A solution of 0.3 g. of sodium in 10 cc. of propanol-2 was concentrated to about 2 cc., 0.6 g. of 2-chloronicotine was added, and the mixture was heated in a sealed tube at 200–220° C. for 16 hours. After diluting the reaction mixture with ether, the isopropoxynicotine was extracted into dilute hydrochloric acid, liberated with sodium hydroxide solution, and extracted into ether. The ether solution was dried over anhydrous sodium sulfate, the solvent was removed, and the residue distilled twice in a high vacuum. 2-isopropoxynicotine appeared as a colorless oil, $n_D^{23}$ 1.6610.

The picrate crystalled from alcohol solution as rosette-shaped crystals, M. P. 136–137° C.

Example VII

*2-phenoxynicotine.*—A solution of 1 g. of phenol and 0.6 g. of potassium hydroxide in 2 cc. of water was heated with 1 g. of 2-chloronicotine in a sealed tube at 230° C. for 48 hours. The dark reaction mixture was made alkaline with sodium hydroxide solution, the oil was extracted into ether, the ether extract was washed, dried, evaporated, and the residual oil distilled twice under 1 mm. pressure. 2-phenoxynicotine appeared as an almost colorless oil, $n_D^{21}$ 1.5686.

I claim:

1. As a new product, a nicotine derivative having the formula

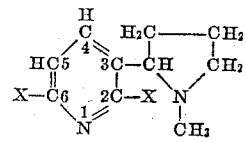

in which at least one X stands for a substituent of the general formula—ORY in which O is oxygen, R is a member of the group consisting of alkyl, aryl and aralkyl radicals and Y is a member of the group consisting of hydrogen and an amino group of the general formula—NZZ in which each Z stands for a member of the group consisting of hydrogen and alkyl, aryl and aralkyl radicals.

2. A compound of the group consisting of the 2- and 6-oxynicotine ethers.

3. Method for the production of a compound of the group consisting of the 2- and 6-derivatives of nicotine which comprises reacting a compound of the group consisting of the 2- and 6-halogenonicotines with a compound of the group consisting of the alkali metal alk-, aryl and aralkoxides.

4. As a new product, an alpha alkoxynicotine.

5. As a new product, an alpha aminoalkoxynicotine.

6. As a new product, an alpha aryloxynicotine.

7. As a new product, an alpha-n-butoxynicotine.

8. As a new product, an alpha-(2-diethylaminoethoxy) nicotine.

9. As a new product, an alpha phenoxynicotine.

ALFRED BURGER.